Patented Apr. 14, 1953

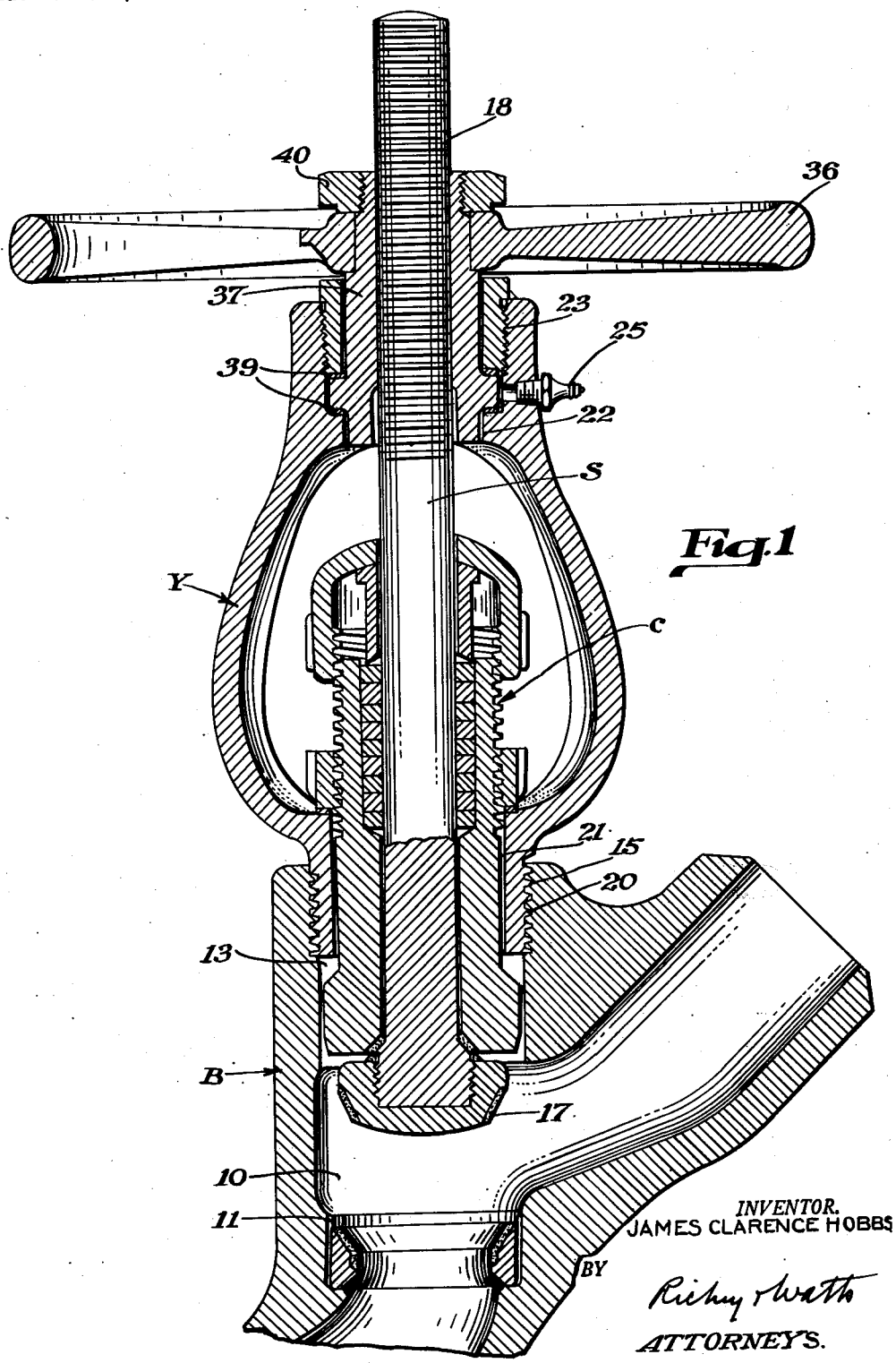

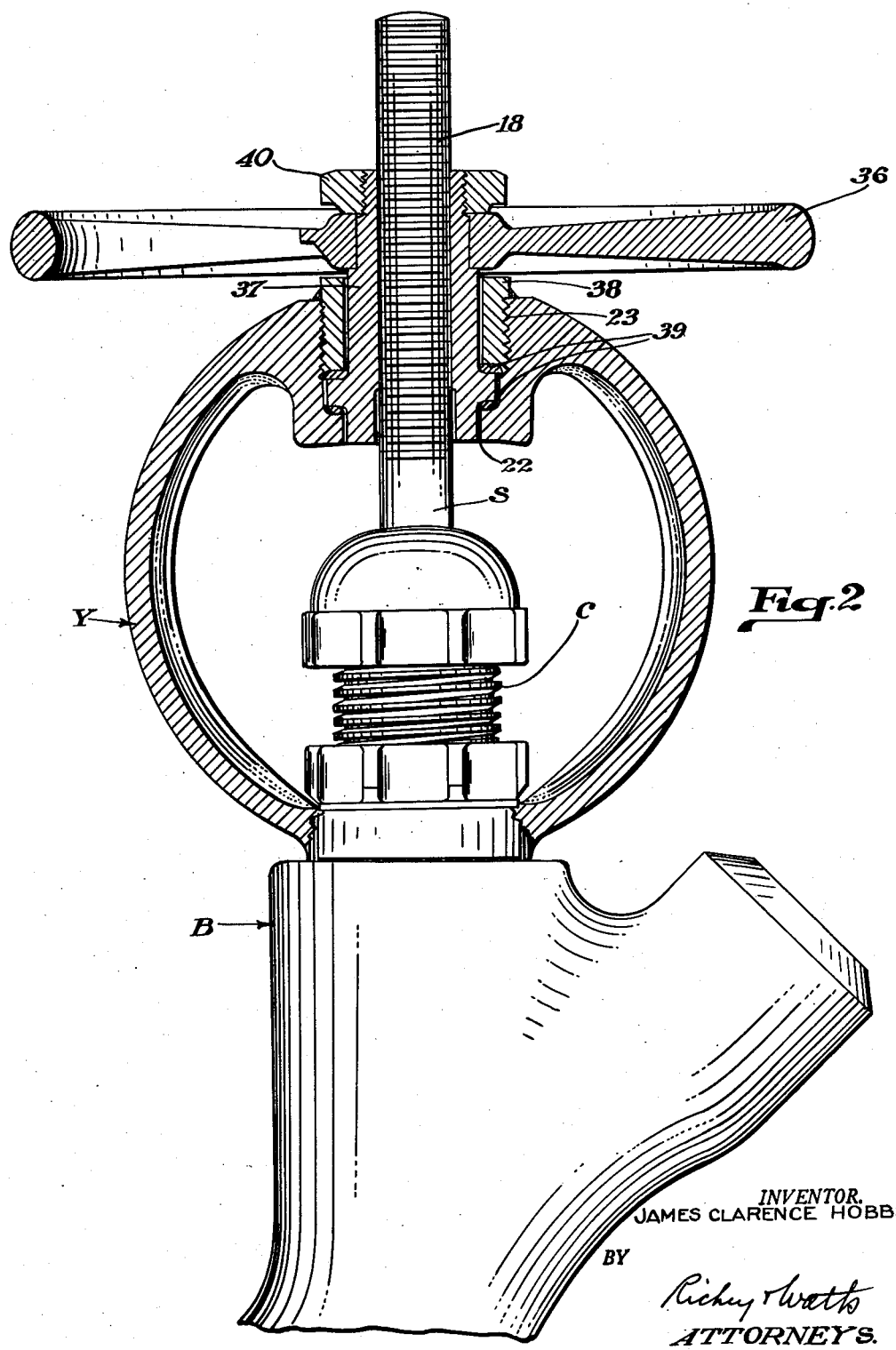

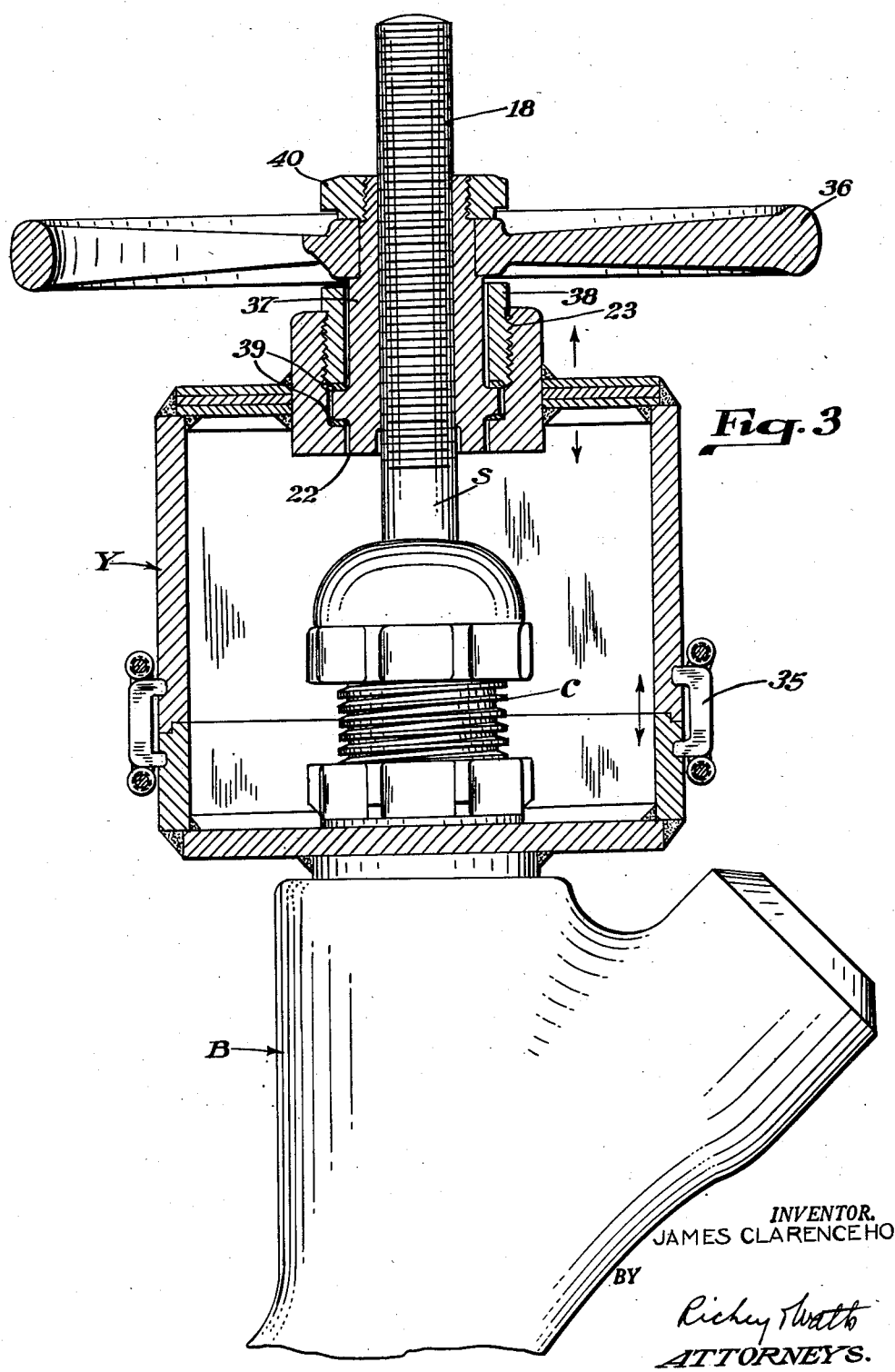

2,634,945

UNITED STATES PATENT OFFICE 2,634,945

SPRING YOKE FOR VALVES

James Clarence Hobbs, Painesville, Ohio

Application June 7, 1947, Serial No. 753,312

4 Claims. (Cl. 251—49)

The present invention relates generally to valves and is particularly concerned with novel valves having resiliently mounted closure elements, and with novel resilient means for mounting valve closure elements.

In use in high temperature-high pressure systems valves of conventional construction either tend to "freeze" so that they cannot be opened when required, or they fail to remain tight as they undergo frequent temperature changes. "Freezing" is so serious that many valves closed while hot have frozen shut so that valve stems and mechanisms have been broken in attempts to open them. Others failed to open even when heated with torches. Another difficulty with high temperature valves is the tendency for their discs and seats to separate with resultant leakage. With conventional valves it is usually necessary when shutting down a system to keep adjusting the valves to prevent freezing or leakage, a difficult and expensive operation. Valves have recently been developed which avoid these difficulties and the consequent need for constant attention of valves in use in high pressure-high temperature systems. These new valves, however, have not been entirely satisfactory due to their large size and high cost of manufacture, and there remains an urgent demand for a complete solution to the problem of valving a high pressure-high temperature system.

The present invention fully responds to this demand, completely eliminating the aforementioned freezing and fluid cutting problems in high pressure-high temperature systems, and constituting a material simplification of construction and reduction in the size and cost of such valves. Furthermore, my valves have greater strength and afford easier access to valve packing glands than valves previously known.

This invention embraces valve yokes which depart radically in construction and effect from conventional valve yokes. In the design and construction of all previous valve yokes, a primary purpose has been to make the yokes rigid and inflexible since they serve merely to secure valve stems in position relative to valve bodies. In contrast, my yokes are of spring construction and in addition to securing valve stems and bodies together, automatically compensate for relative expansion and contraction of said bodies and stems. These new yokes in addition serve the aforementioned stem-engaging and positioning function. This invention consequently avoids combinations of separate springs and mountings which have previously been suggested for use to overcome the freezing and fluid cutting problems of valving high pressure-high temperature systems, but which have not been generally adopted because of their impracticability.

Those skilled in the art will gain a further understanding of this invention by referring to the drawings accompanying and forming part of this specification, in which Figure 1 is a sectional elevational view of a globe valve equipped with a yoke embodying the present invention;

Figure 2 is a sectional elevational view of a similar valve provided with a spherical spring yoke of this invention; and Figure 3 is a sectional elevational view of another globe valve provided with a cylindrical spring yoke of this invention.

In general, the valves of this invention include a body B, a stem S movable to regulate fluid flow through the body, a bonnet C, a resilient yoke Y for limiting movement of stem S relative to body B, and means for moving the stem relative to the body to regulate fluid flow therethrough.

The body of each of the illustrated valves has a passage way 10 for fluid, a valve seating surface 11 and valve access opening 13 disposed opposite surface 11. The wall of body B defining opening 13 is provided with threads 15 in its outer portion.

Stem S is an elongated, rod-like member having an end portion fitted with a disc 17 for engagement with seating surface 11 to close the valves and an opposite end portion provided with threads 18.

The valve bonnet C of the illustrated valves is of the self-sealing type described and claimed in my U. S. Patent No. 2,321,597 issued June 15, 1943.

Yoke Y of Fig. 1 is a generally pear-shaped element having substantially cylindrical threaded lower and upper end portions and an intermediate portion including spaced struts providing windows affording access to the bonnet. The lower end portion of the yoke is provided with external threads 20 for engagement with threads 15 and has an axial aperture 21 to receive the stem S and bonnet C. The upper end of the yoke is provided with an axial aperture 22 and threads 23 disposed near the outer end of said aperture. The yoke is of light construction in its intermediate portion and is sufficiently resilient to produce the foregoing desirable results. The upper threaded end portion of the yoke is provided with an Alemite fitting 25 for lubrication of washers of the stem moving means disposed in aperture 22.

Referring to Figs. 2 and 3, the yoke of this invention may assume a variety of forms and may include a single resilient element or a plurality of such elements which may constitute either a side or end portion of the yoke, depending upon the design and construction desired. In the case of the spherical yoke of Fig. 2, the resilient portions of the yoke are the intermediate, substantially semi-circular strut portions between the upper and lower ends of the yoke. The yoke of Fig. 3 has a rigid intermediate side but has a resilient and laminated, diaphragm-like upper end portion. This latter yoke is made up of upper and lower side portions, and a split ring 35 having flanges to engage grooves in said upper and lower portions and secure the portions together.

The yokes of Figs. 2 and 3, like that of Fig. 1, may be secured to the valve body and to the stem and stem moving means by the means illustrated and described above in reference to Fig. 1. That is, the lower portion of the yoke in each case is provided with threads on its external surface for engagement with threads 15 in the body. The stem moving means of the Fig. 3 valve includes a hand wheel 36, a yoke sleeve 37 having an annular external flange adjacent to its lower end and a threaded aperture to receive the upper threaded end of stem S, an externally threaded yoke sleeve nut 38, yoke sleeve washers 39 between said flange and the yoke and the yoke sleeve nut, and a handwheel nut 40 for retaining the handwheel in position relative to the yoke sleeve. The handwheel is keyed to the yoke sleeve which is rotatable on washers 39 relative to yoke Y and yoke sleeve nut 38. The yoke sleeve nut is threadwise engaged with the yoke and the handwheel nut is likewise secured to the yoke sleeve.

The illustrated valves may be assembled by securing the yoke and bonnet to the body, disposing the stem S in engagement in the usual manner with the bonnet so that the valve disc is disposed below the bonnet while the threaded end portion of the stem extends through the packing gland of the bonnet, and through aperture 22 of the yoke, engaging yoke sleeve 37 with the threaded end of the stem, engaging the yoke sleeve nut with threads 23, keying the handwheel to the yoke sleeve and securing handwheel in place by means of handwheel nut 40.

Operation of the valve to regulate the flow of fluid therethrough is accomplished by rotation of the handwheel thereby to move the stem relative to the valve body. When the valve is closed, that is, when disc 17 is engaged securely in fluid tight contact with seating surface 11, it will not be necessary to periodically test the tightness of this engagement to prevent aforementioned damaging freezing situation from arising.

The resiliency of the yoke is such that when the stem elongates due to its increase in temperature and when the valve body contracts due to its simultaneous decrease in temperature, there is no appreciable change in the seating load; consequently there is neither freezing nor leakage.

Those skilled in the art will appreciate that while the yokes of this invention are resilient so as to prevent overloading of the valve disc and seating surface they may also operate to maintain a substantially constant seating pressure. For instance, if after the valve has been closed without abnormal pressure which would tend to damage the sealing surface of the valve disc, the pressure between the sealing surface and the disc increases to a dangerous level and then subsides to a somewhat lower level, the yoke will permit the stem first to elongate and change the shape of the yoke to the extent necessary to relieve the excess pressure, and then will permit the stem to return to its original dimensions as the source of the excess pressure is dissipated.

Those skilled in the art will readily understand that there are a number and variety of forms of yokes of this invention in addition to the spherical, cylindrical and pear-shaped or conical yokes illustrated herein. They will also appreciate that these various yokes may be incorporated in the various types of valves in present use and that resiliency may be varied from yoke to yoke to suit the different requirements. Also, a plurality of these resilient elements may be combined in a single yoke to obtain the desired resiliency. In any event, however, the elastic limits of the resilient or flexible parts of the yokes of this invention should be sufficiently high that the parts will not be permanently deformed in use by pressures applied through the valve stems.

Having thus described the present invention so that those skilled in the art may be able to understand and practice the same, I state that what I desire to secure by Letters Patent is defined in what is claimed:

1. A valve comprising a body having a fluid chamber and a valve-receiving opening, a yoke having a first annular portion secured to the body, a second annular portion remote from the first annular portion, and an intermediate portion connecting said annular portions, a bonnet in said opening and first annular portion, a valve stem extending through said bonnet and into said second annular portion and having a seat-engaging valve, a seat engageable by said valve, and means operatively associated with said second annular portion for moving said stem endwise in either direction and exerting forces on said yoke endwise of the stem, said intermediate portion of the yoke being disposed out of contact with fluid in said chamber, being positioned at an angle to the longitudinal axis of the stem, being arranged symmetrically with respect to the stem, and being capable of deflecting substantially uniformly under excessive forces applied by the stem moving means when said valve and seat are engaged.

2. The combination of parts set out in claim 1 in which the intermediate portion of the yoke includes bent struts.

3. The combination of parts set out in claim 1 in which the intermediate portion of the yoke includes semi-circular struts.

4. The combination of parts set out in claim 1 in which the intermediate portion of the yoke includes a diaphragm.

JAMES CLARENCE HOBBS.

References Cited in the file of this patent

UNITED STATES PATENTS

| Number | Name | Date |
|--------|------|------|
| 23,658 | Bradford | Apr. 19, 1859 |
| 130,570 | Davis | Aug. 20, 1872 |
| 155,699 | Bolton | Oct. 6, 1874 |
| 1,246,892 | Donnelly | Nov. 20, 1917 |
| 1,667,590 | Donnelly | Apr. 24, 1928 |
| 2,119,851 | Cave | June 7, 1938 |

FOREIGN PATENTS

| Number | Country | Date |
|--------|---------|------|
| 22,349 | Great Britain | of 1900 |
| 627,866 | Germany | of 1933 |